(No Model.)
W. P. BUCHAN.
WATER CLOSET.
No. 287,225. Patented Oct. 23, 1883.
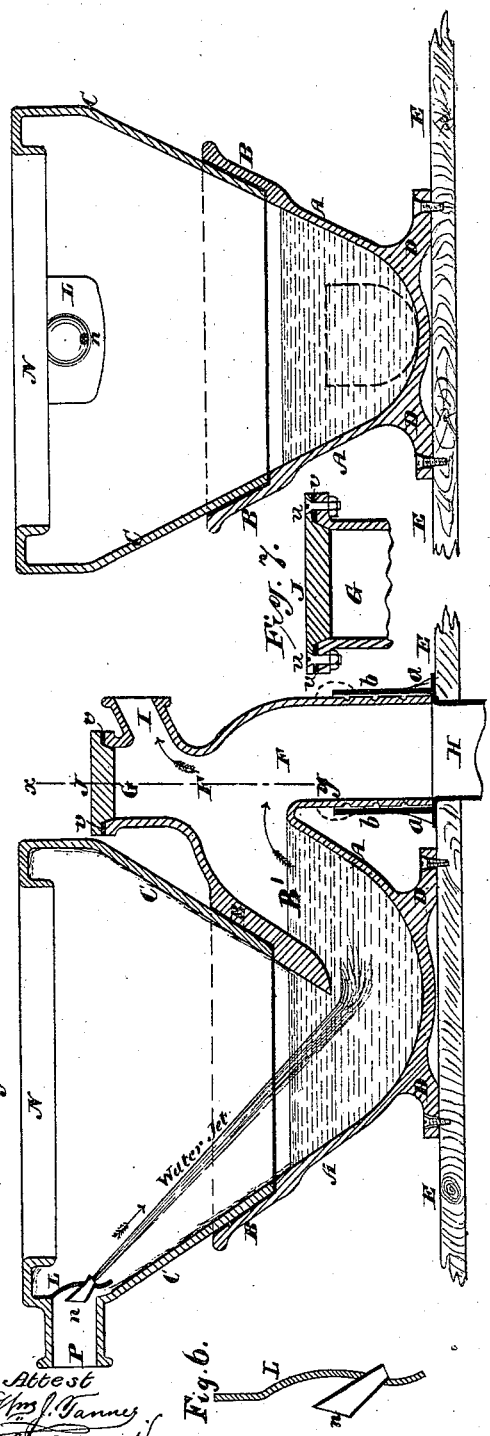
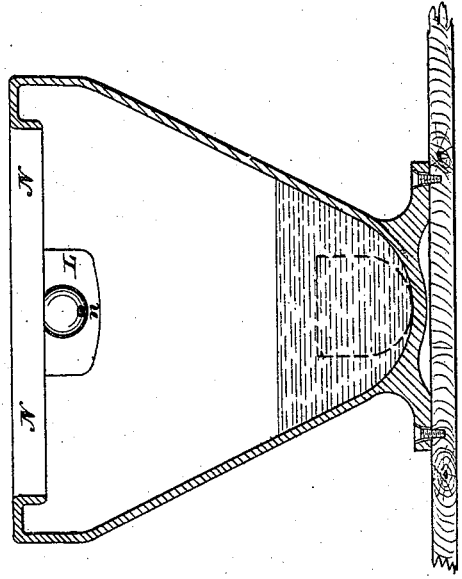
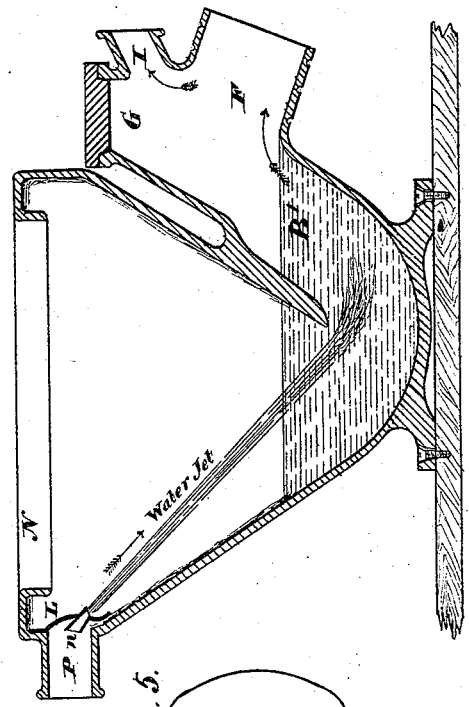
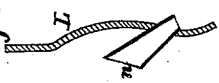

United States Patent Office.

WILLIAM P. BUCHAN, OF GLASGOW, COUNTY OF LANARK, SCOTLAND.

WATER-CLOSET.

SPECIFICATION forming part of Letters Patent No. 287,225, dated October 23, 1883.

Application filed February 28, 1883. (No model.) Patented in England December 24, 1879, No. 5,272.

*To all whom it may concern:*

Be it known that I, WILLIAM PATON BUCHAN, a citizen of the United Kingdom of Great Britain and Ireland, residing at Glasgow, in the county of Lanark, North Britain, have invented certain new and useful Improvements in Water-Closets; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention, which has for its object improvements in water-closets, relates both to those classes of water-closets in which the basins are formed separate from and rest in sockets made to receive them in the traps, and also to water-closets in which the basins are formed in one piece with the trap.

In order that the said invention may be properly understood, I now proceed more particularly to describe the same with reference to the figures on the sheet of drawings hereunto appended.

Figure 1 is a longitudinal section, and Fig. 2 a vertical transverse sectional view, of the improved water-closet with the basin and trap formed separately from each other, while Figs. 3 and 4 are respectively a vertical longitudinal section and vertical cross-section of the improved water-closet with the basin and trap formed in one piece. Fig. 5 is a detail plan of the part marked J, Fig. 1. Fig. 6 is an enlarged detailed section of the part marked L. Fig. 7 is a transverse vertical section on the line $x\,y$, Fig. 1.

As shown by Figs. 1 and 2, the trap A, on the house side, is widened into a conical socket, B, made with a seat or ledge at its lower end for the lower end of the basin C to rest on, the said seat or ledge being preferably above the surface of the water in the trap. The joint between the basin C and the trap A is made with Kean's, Portland, or other cement, stucco, red lead, putty, or other equivalent material, and below the resting seat or ledge of the conical socket B the trap is made wide and deep enough on the house side to give in the trap itself a sufficient surface and depth of water to form the water lock or seal without allowing the water constituting the said lock or seal to rise into the lower end of the basin.

B' is the passage leading from the trap.

The trap A is formed or provided with a seat, sole, or feet, D, which either rest on the floor E, as shown, or on a block of wood or other equivalent, if desired, to raise the closet higher, or in the lead or other safe usually placed below water-closet basins to catch or intercept leakage from the basin, and the said seat, sole, or feet may be of such a height or depth that the bottom of the trap A may be close to the floor or raised to any desired distance therefrom.

The outlet pipe or end F of the trap, which may be of the usual S or P form, or of any other suitable form, has, under this invention, an access-opening, G, formed on its top, to afford easy access not only to the outer part, F, but also to the branch soil-pipe H beyond the trap, for the purpose of examination and cleansing; and on the side of the said opening G a ventilating horn or branch, I, is made, to which a pipe leading to the exterior of the building, or to a point of the soil-pipe above all the closets or other appliances is connected, to carry off any foul air or gases which may rise through the pipe H, and also to assist in preventing "siphonage," or emptying of the trap A, when this closet or any other closet or appliance discharging liquids or other matters into the same soil-pipe is used.

The access-opening G is closed by a fire-clay, earthenware, metal, or other lid or cover, J, which is preferably oval or elliptical in plan, as shown in Fig. 5, and held in position, preferably, by two bolts, $u$, in the line of its greatest length, as shown in Fig. 7; and an india-rubber or other elastic ring, $v$, as shown in Figs. 1 and 7, may be placed between the flanges of the opening G and of the lid or cover J, to insure an air and gas tight joint; or washers of leather, pasteboard, asbestus, millboard, or a red lead, stucco, or putty lute, or equivalent material, may be used for that purpose.

The branch soil-pipe H, when made of lead, is widened at its upper end and flattened down, as shown, and it is or may be connected by solder at *a* to another section, *b*, of larger lead pipe, into which the lower end of the outlet pipe or end F of the trap is slipped, and secured by a packing of hemp and red lead, cement, or other equivalent, and, in addition, if desired, the pipe *b*, at its upper part, may be further secured to the trap by a lapped joint of red lead, putty, or cement and cloth, or other equivalent, or by a plain or hinged metal tie secured by one or more bolts and nuts.

In the arrangement shown at Figs. 3 and 4 of the drawings, in which the basin and trap are made in one piece, the outlet pipe or end F of the trap is also provided with an access-opening G and a ventilating horn or branch I, as and for the purposes described with reference to the preceding figures.

In the arrangement shown at Figs. 1 and 2, the basin A is preferably circular in horizontal section; but in that shown by Figs. 3 and 4 it may be circular, oval, elliptical, or of other desired form in horizontal section. In both of the arrangements a loose or flexible fan or water spreader or director, L, of lead or other metal, is secured by bolts and nuts, cement, or equivalent means to the inner surface of the basin, immediately in front of the entrance water-way P and below the flushing-rim N, as in ordinary water-closet basins.

The fan or water-spreader is shown in enlarged section at Fig. 6, and near its center, and opposite the entrance-horn P, a short and preferably conical pipe, *n*, is soldered, cast, or otherwise secured in an oblique or inclined position, so as to direct a current or jet of the water into the center of the basin and produce a cascade action upon or near the center of the surface of the water in the trap, in addition to the ordinary action of the water in flushing around and down the interior surface of the basin, for the purpose of cleansing the same. This water-jet or cascade has the effect of submerging the floating paper and soil and forcing them toward the bottom and outlet of the trap, from whence they pass off through the soil-pipe.

As shown by Figs. 1, 3, and 6, the upper side of the pipe *n*, where it is connected to the fan L, projects through and beyond the opening in the fan, and the said pipe *n* being preferably made of lead or other ductile metal, its discharging end can be easily bent or adjusted so as to cause the current constituting the jet or cascade to strike the surface of the water in the trap at any desired point, a point at or near the center of that surface being, as already stated, preferred.

Having now described the said invention and the mode of carrying the same into practical effect, I would observe in conclusion that I am aware that an action for the purpose of sinking the paper and soil floating in the trap has been produced before the date of this invention by one or more special currents of water admitted to the interior of the basin by a jet, nozzle, or nozzles passing from the inlet-horn entirely through or over the flushing-rim, some of which arrangements are cast in one piece with the basin, and whereby the cost of constructing the basin is materially increased. It is therefore to be understood that I do not claim to have invented the production of such an action for water-closets otherwise than by the addition of an adjustable conical pipe to the ordinary loose lead or other metal fan, as described—that is to say,

What I desire to claim and secure by Letters Patent is—

1. In a water-closet, a basin having a trap, A, providing a sealed passage, B', from the trap, and an outlet-pipe, F, formed with an access-opening, G, and ventilating-horn I, both the access-opening and the ventilating-horn being in direct communication with the outlet pipe and passage from the trap, as set forth.

2. The combination, with a water-closet basin, of a flexible metal fan provided with a short conical pipe, both fan and pipe adapted to be bent to the desired position to direct the current of water to a central point on the surface of the water-seal, as set forth.

In testimony whereof I, the said WILLIAM PATON BUCHAN, have hereunto set my hand and seal this 15th day of February, in the year of our Lord 1883.

W. P. BUCHAN. [L. S.]

In presence of—
 GEO. M. CRUIKSHANK,
 THOS. R. ANDERSON,
  *Both of 135 Buchanan St., Glasgow.*